(12) United States Patent
Huang et al.

(10) Patent No.: US 11,163,108 B1
(45) Date of Patent: Nov. 2, 2021

(54) LIGHTING MODULE AND DISPLAY DEVICE

(71) Applicant: E Ink Holdings Inc., Hsinchu (TW)

(72) Inventors: Yen-Ze Huang, Hsinchu (TW);
Tsai-Wei Shei, Hsinchu (TW);
Chih-Ching Yen, Hsinchu (TW);
Hsin-Tao Huang, Hsinchu (TW)

(73) Assignee: E Ink Holdings Inc., Hsinchu (TW)

( * ) Notice: Subject to any disclaimer, the term of this patent is extended or adjusted under 35 U.S.C. 154(b) by 0 days.

(21) Appl. No.: 17/165,969

(22) Filed: Feb. 3, 2021

(30) Foreign Application Priority Data

Apr. 30, 2020 (TW) .................................. 109114561

(51) Int. Cl.
*F21V 8/00* (2006.01)
(52) U.S. Cl.
CPC ........... *G02B 6/0093* (2013.01); *G02B 6/009* (2013.01); *G02B 6/0073* (2013.01)
(58) Field of Classification Search
CPC .. G02B 6/0073; G02B 6/0083; G02B 6/0093; G02B 6/009
See application file for complete search history.

(56) References Cited

U.S. PATENT DOCUMENTS

| | | | |
|---|---|---|---|
| 8,199,306 B2 | 6/2012 | Lee et al. | |
| 8,684,581 B2 | 4/2014 | Jeon et al. | |
| 10,129,994 B1 | 11/2018 | Sulem et al. | |
| 10,203,448 B1* | 2/2019 | Li | G02B 6/002 |
| 2008/0225506 A1* | 9/2008 | Huang | G02B 6/0056 |
| | | | 362/19 |
| 2009/0237592 A1 | 9/2009 | Mizutani | |
| 2014/0307474 A1* | 10/2014 | Kim | G02B 6/0091 |
| | | | 362/613 |
| 2018/0321556 A1* | 11/2018 | Watanabe | G02B 6/0091 |
| 2019/0162892 A1* | 5/2019 | Shin | G02B 6/009 |
| 2019/0235289 A1* | 8/2019 | Asatani | G02B 6/0083 |
| 2020/0400872 A1* | 12/2020 | Chen | G02B 6/0053 |

FOREIGN PATENT DOCUMENTS

| | | |
|---|---|---|
| CN | 208011416 U | 10/2018 |
| TW | 201910687 A | 3/2019 |

OTHER PUBLICATIONS

Corresponding Taiwan office action dated Jun. 15, 2020.

* cited by examiner

*Primary Examiner* — Mary Ellen Bowman
(74) *Attorney, Agent, or Firm* — CKC & Partners Co., LLC

(57) ABSTRACT

A lighting module includes a circuit board, a light emitting diode, a light guide plate, and a waterproof adhesive. The circuit board has an insulating layer, a metal layer, and a circuit layer. The insulating layer is interposed between the metal layer and the circuit layer. The metal layer has an opening exposing a portion of the insulating layer. The light emitting diode has a light emitting surface and a non-light emitting surface facing the metal layer. The light guide plate is parallel or substantially parallel to the circuit board and is adjacent to the light emitting surface of the light emitting diode. An optical axis of the light emitting diode coincides with or substantially coincides with a symmetry axis of the light guide plate. The portion of the insulating layer is adhered to the light guide plate through the waterproof adhesive.

11 Claims, 4 Drawing Sheets

LIGHTING MODULE AND DISPLAY DEVICE

CROSS-REFERENCE TO RELATED APPLICATION

This application claims priority to Taiwan Application Serial Number 109114561, filed Apr. 30, 2020, which is herein incorporated by reference.

BACKGROUND

Field of Invention

The present invention relates to a lighting module and a display device including the lighting module.

Description of Related Art

Most of the existing lighting modules do not have waterproof structures and thus are vulnerable to moisture, resulting in circuit short or corrosion. Therefore, how to improve the lighting module and the display device using the lighting module to make those have good water resistance is an issue that needs to be improved in the art.

SUMMARY

A purpose of the present invention is to provide a lighting module and a display device having good water resistance. Since a metal layer of the circuit board has an opening exposing a portion of the insulating layer, a thick waterproof adhesive can be provided between the portion of the insulating layer and the light guide plate, thereby effectively preventing the light emitting diode from being damaged by moisture.

The present invention provides a lighting module, which includes a circuit board, a light emitting diode, a light guide plate, and a waterproof adhesive. The circuit board has an insulating layer, a metal layer, and a circuit layer. The insulating layer is interposed between the metal layer and the circuit layer. The metal layer has an opening exposing a portion of the insulating layer. The light emitting diode has a light emitting surface and a non-light emitting surface, and the non-light emitting surface faces the metal layer. The light guide plate is parallel or substantially parallel to the circuit board and is adjacent to the light emitting surface of the light emitting diode. An optical axis of the light emitting diode coincides with or substantially coincides with a symmetry axis of the light guide plate. The portion of the insulating layer is adhered to the light guide plate through the waterproof adhesive.

According to some embodiments of the present invention, the circuit board further includes a solder paste disposed between the non-light emitting surface of the light emitting diode and the metal layer.

According to some embodiments of the present invention, the circuit board further includes a plating layer disposed between the solder paste and the metal layer.

According to some embodiments of the present invention, the lighting module further includes a first cover layer covering the metal layer and laterally adjacent to the solder paste.

According to some embodiments of the present invention, the lighting module further includes a second cover layer covering the circuit layer.

According to some embodiments of the present invention, the lighting module further includes a substrate parallel or substantially parallel to the circuit board, and the light guide plate is interposed between the circuit board and the substrate.

According to some embodiments of the present invention, the waterproof adhesive is further disposed between the light guide plate and the substrate.

According to some embodiments of the present invention, the waterproof adhesive is further disposed between the circuit board and the substrate.

According to some embodiments of the present invention, the insulating layer has a via hole disposed in the insulating layer, and the light emitting diode is electrically connected to the circuit layer through the metal layer and the via hole.

The present invention also provides a display device, which includes the aforementioned lighting module and a display panel fixed on a surface of the light guide plate.

The present invention further provides a lighting module, which includes a circuit board, a light emitting diode, a light guide plate, and a waterproof adhesive. The circuit board has a thin portion. The light emitting diode is adjacent to the thin portion of the circuit board. The light emitting diode has a light emitting surface and a non-light emitting surface, and the non-light emitting surface faces the circuit board. The light guide plate is parallel or substantially parallel to the circuit board and is adjacent to the light emitting surface of the light emitting diode. The thin portion of the circuit board is adhered to the light guide plate through the waterproof adhesive.

BRIEF DESCRIPTION OF THE DRAWINGS

In order to make the above and other objects, features, advantages and embodiments of the present invention more obvious and easy to understand, please read the following detailed description with the corresponding drawings.

DETAILED DESCRIPTION

Figure 1:
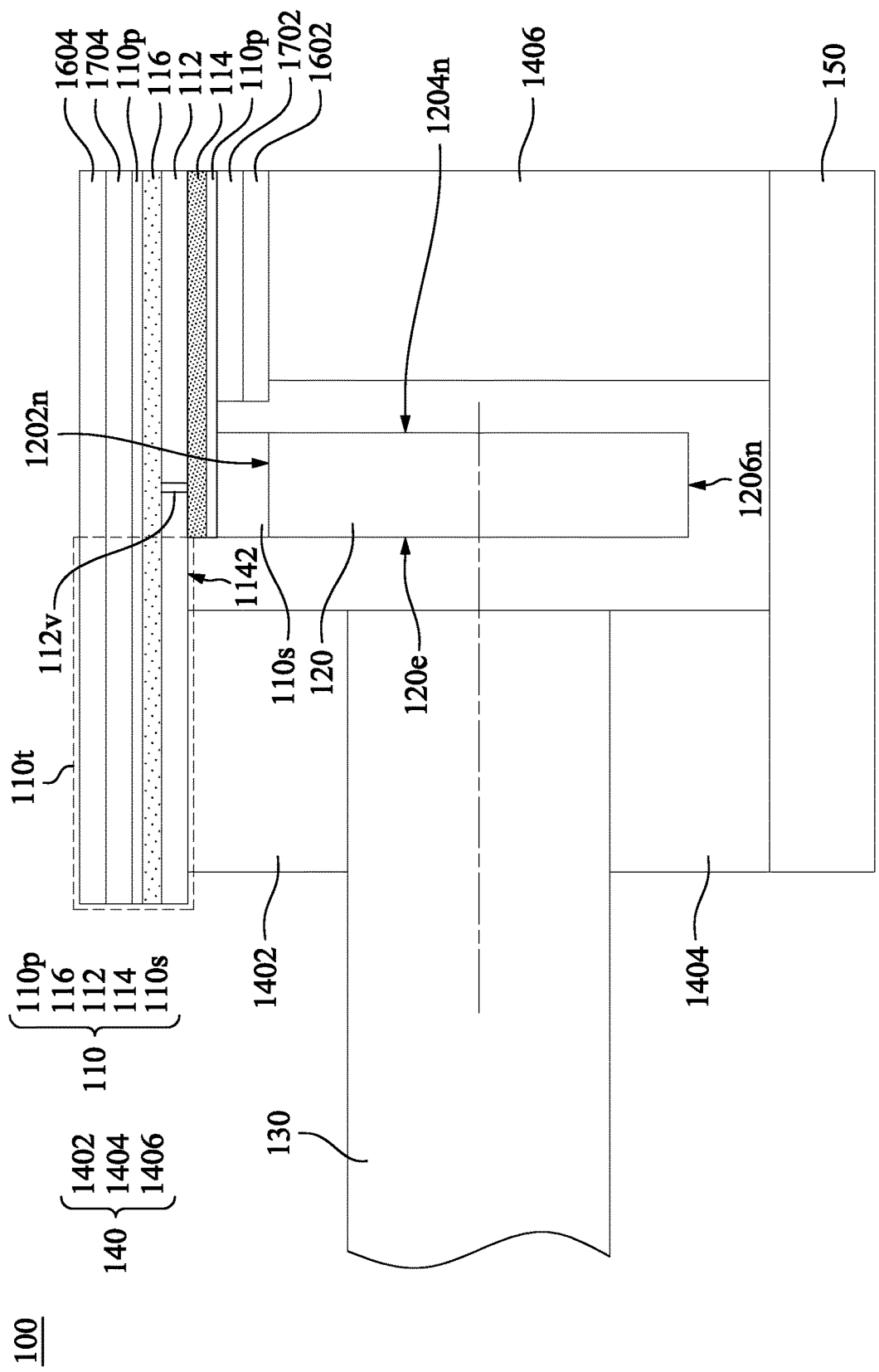
FIG. 1 is a schematic cross-sectional view of a lighting module according to an embodiment of the present invention.

The following disclosure provides many different embodiments or examples, for implementing different technical features of the provided subject matter. Specific examples of components and arrangements are described below to simplify the present invention. These are, of course, merely examples and are not intended to be limiting. For example, the formation of a first feature over a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "over" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations), and the spatially relative descriptions used herein may likewise be interpreted accordingly.

The present invention provides a lighting module, which can be applied to a backlight module or a front light module of a display panel. In some embodiments, the lighting module includes a light guide plate disposed on a back surface or a display surface of the display panel. Various embodiments of the lighting module will be detailed below.

FIG. 1 is a schematic cross-sectional view of a lighting module according to an embodiment of the present invention. The lighting module includes a circuit board 110, a light emitting diode 120, a light guide plate 130 and a waterproof adhesive 140.

The circuit board 110 has an insulating layer 112, a metal layer 114 and a circuit layer 116. The insulating layer 112 is disposed between the metal layer 114 and the circuit layer 116. The metal layer 114 has an opening 1142 exposing a portion of the insulating layer 112.

In some embodiments, the circuit board is a double-layer board (e.g., circuit layer 116/insulating layer 112/metal layer 114 shown in FIG. 1). In other embodiments, the circuit board is a three-layer board (e.g., second circuit layer/second insulating layer/first circuit layer/first insulating layer/metal layer, not shown) or a circuit board with sum of the metal layer and the circuit layer greater than three layers (not shown).

In some embodiments, the insulating layer 114 is a plastic substrate, such as polyimide (PI), polyethylene terephthalate (PET), polyethylene naphthalate (PEN), Teflon, liquid crystal polymer (LCP), polyethylene (PE), polypropylene (PP), polystyrene (PS), polyvinyl chloride (PVC), Nylon or polyamides, polymethyl methacrylate (PMMA), acrylic, acrylonitrile-butadiene-styrene (ABS), phenolic resins, epoxy, polyester, silicone, polyurethane (PU), polyamide-imide (PAI), other suitable materials or a combination thereof, but not limited thereto.

In some embodiments, the metal layer 114 is a copper foil or other suitable metal foil. In some embodiments, the circuit layer 116 is formed by performing a patterning process on a metal material layer (e.g., a copper foil or other suitable metal foil), and the patterning process may be lithography and etching processes.

The light emitting diode 120 has a light emitting surface 120e and a non-light emitting surface. In some embodiments, referring to FIG. 1, which shows a cross section of the lighting module, the light emitting diode 120 has the light emitting surface 120e and a plurality of non-light emitting surfaces 1202n, 1204n, and 1206n, and the non-light emitting surface 1202n faces the metal layer 114. In some embodiments, the insulating layer 112 has a via hole 112v disposed in the insulating layer 112, and the light emitting diode 120 is electrically connected to the circuit layer 116 through the metal layer 114 and the via hole 112v.

In some embodiments, the lighting module 100 includes a plurality of light emitting diodes (FIG. 1 only shows a cross-section of the one light emitting diode 120 of the light emitting diodes), and the circuit board 110 and the light emitting diodes constitute a light bar.

The light guide plate 130 is parallel or substantially parallel to the circuit board 110 and is adjacent to the light emitting surface 120e of the light emitting diode 120. As indicated by the dotted line in FIG. 1, an optical axis of the light emitting diode 120 coincides with or substantially coincides with a symmetry axis of the light guide plate 130 to avoid light leakage.

In some embodiments, a height (or a thickness) of the light emitting diode 120 is greater than or equal to a thickness of the light guide plate 130. In some embodiments, a ratio of the height of the light emitting diode 120 to the thickness of the light guide plate 130 is in a range of from 2.5:1 to 1.5:1.

In some embodiments, the circuit board 110 further includes a solder paste 110s disposed between the non-light emitting surface 1202n of the light emitting diode 120 and the metal layer 114. In some embodiments, the circuit board 110 further includes a plating layer 110p disposed between the solder paste 110s and the metal layer 114. The aforementioned solder paste 110s and/or the plating layer 110p may be used to properly heighten the light emitting diode 120 so that the optical axis of the light emitting diode 120 coincides with or substantially coincide with the symmetry axis of the light guide plate 130, as shown by the dotted line in FIG. 1.

In some embodiments, the waterproof adhesive 140 includes waterproof adhesive 1402, 1404, and 1406. The exposed portion of the insulating layer 112 is adhered to the light guide plate 130 through the waterproof adhesive 1402. In order to increase the waterproof effect, the thicker the waterproof adhesive is, the better the waterproof effect is. Therefore, the present invention provides the circuit board 110 having a stepped structure, in which the metal layer 114 has the opening 1142 exposing the portion of the insulating layer 112, and there is no metal layer 114 here, such that the thicker waterproof adhesive 1402 can be provided between the portion of the insulating layer 112 and the light guide plate 130 to effectively prevent the light emitting diode 120 from being damaged by moisture. In an embodiment, the waterproof adhesive 140 may be, for example, a waterproof double-sided adhesive tape.

In some embodiments, the lighting module 100 further includes a first cover layer 1602 covering the metal layer 114 to protect the metal layer 114 from moisture. In some embodiments, as shown in FIG. 1, the first cover layer 1602 is laterally adjacent to the solder paste 110s. In some embodiments, the lighting module 100 further includes a first adhesive layer 1702, and the first cover layer 1602 is adhered to the circuit board 110 through the first adhesive layer 1702.

In some embodiments, the lighting module 100 further includes a second cover layer 1604 covering the circuit layer 116 to protect the circuit layer 116 from moisture. In some embodiments, the lighting module 100 further includes a second adhesive layer 1704, and the second cover layer 1604 is adhered to the circuit board 110 through the second adhesive layer 1704.

In some embodiments, the lighting module 100 further includes a substrate 150 parallel or substantially parallel to the circuit board 110, and the light guide plate 130 is interposed between the circuit board 110 and the substrate 150. In some embodiments, the substrate 150 includes a plastic substrate, such as Mylar, biaxial oriented polypropylene (BOPP), polyimide, polyethylene terephthalate, polyethylene naphthalate, Teflon, liquid crystal polymer, polyethylene, polypropylene, polystyrene, polyvinyl chloride, Nylon, polymethyl methacrylate, acrylonitrile-butadiene-styrene, phenol resins, epoxy, polyester, silicone, polyurethane, polyamide-imide, other suitable materials or combinations thereof, but not limited thereto.

In some embodiments, the waterproof adhesive 1404 is disposed between the light guide plate 130 and the substrate 150 to effectively prevent the light emitting diode 120 from being damaged by moisture.

In some embodiments, the waterproof adhesive 1406 is disposed between the circuit board 110 and the substrate 150 to effectively prevent the light emitting diode 120 from being damaged by moisture. In some embodiments, the waterproof adhesive 1406 is adhered between the first cover layer 1602 and the substrate 150.

Figure 2:
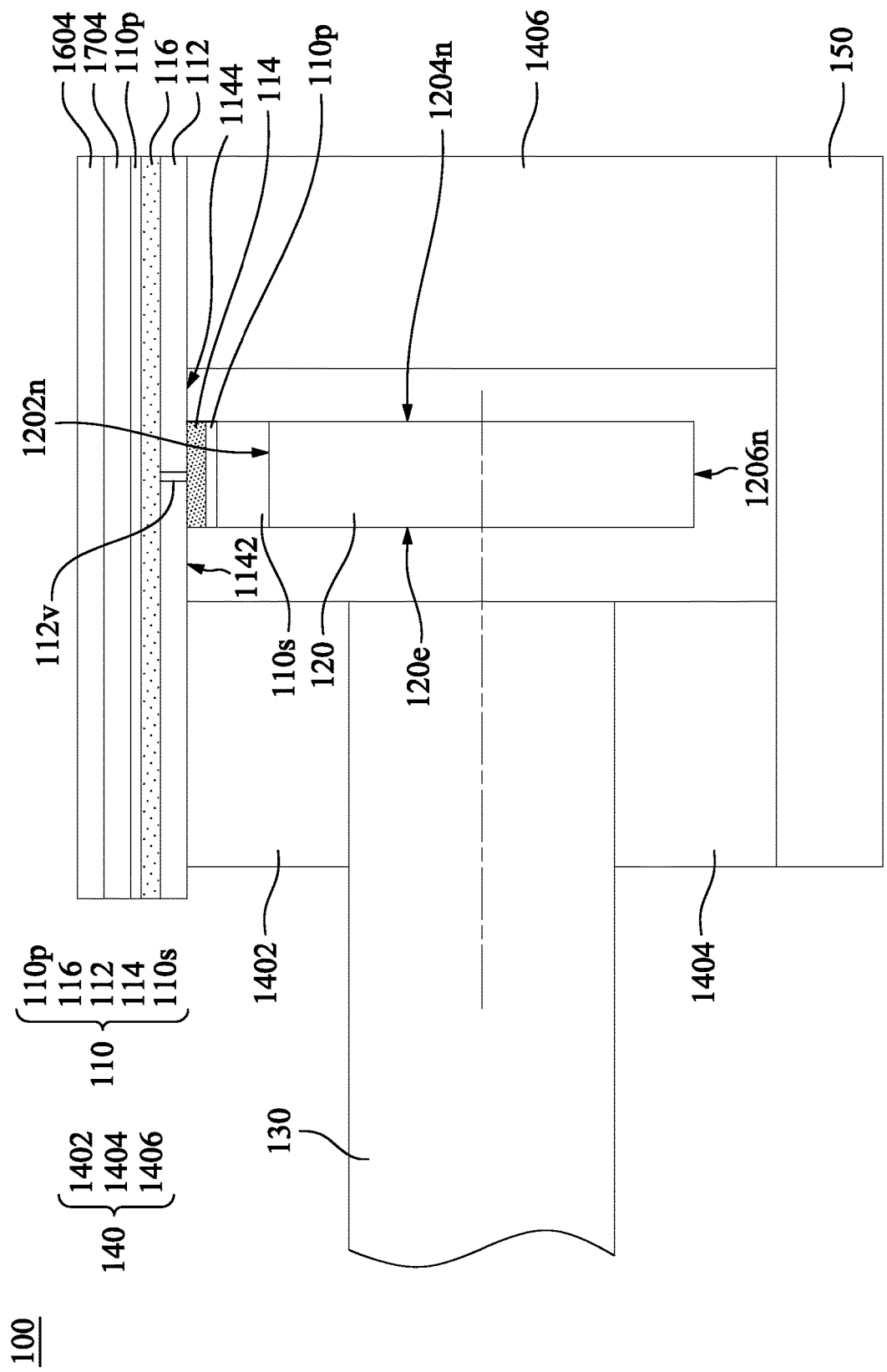
FIG. 2 is a schematic cross-sectional view of a lighting module according to another embodiment of the present invention.

FIG. 2 is a schematic cross-sectional view of a lighting module according to another embodiment of the present invention. The difference between FIG. 2 and FIG. 1 is that the metal layer 114 of FIG. 2 has another opening 1144 exposing another portion of the insulating layer 112, and the lighting module of FIG. 2 does not include the first cover layer 1602 and the first adhesive layer 1702 shown in FIG. 1, so the waterproof adhesive 1406 of FIG. 2 is adhered between the other portion of the insulating layer 112 and the substrate 150.

Figure 3:
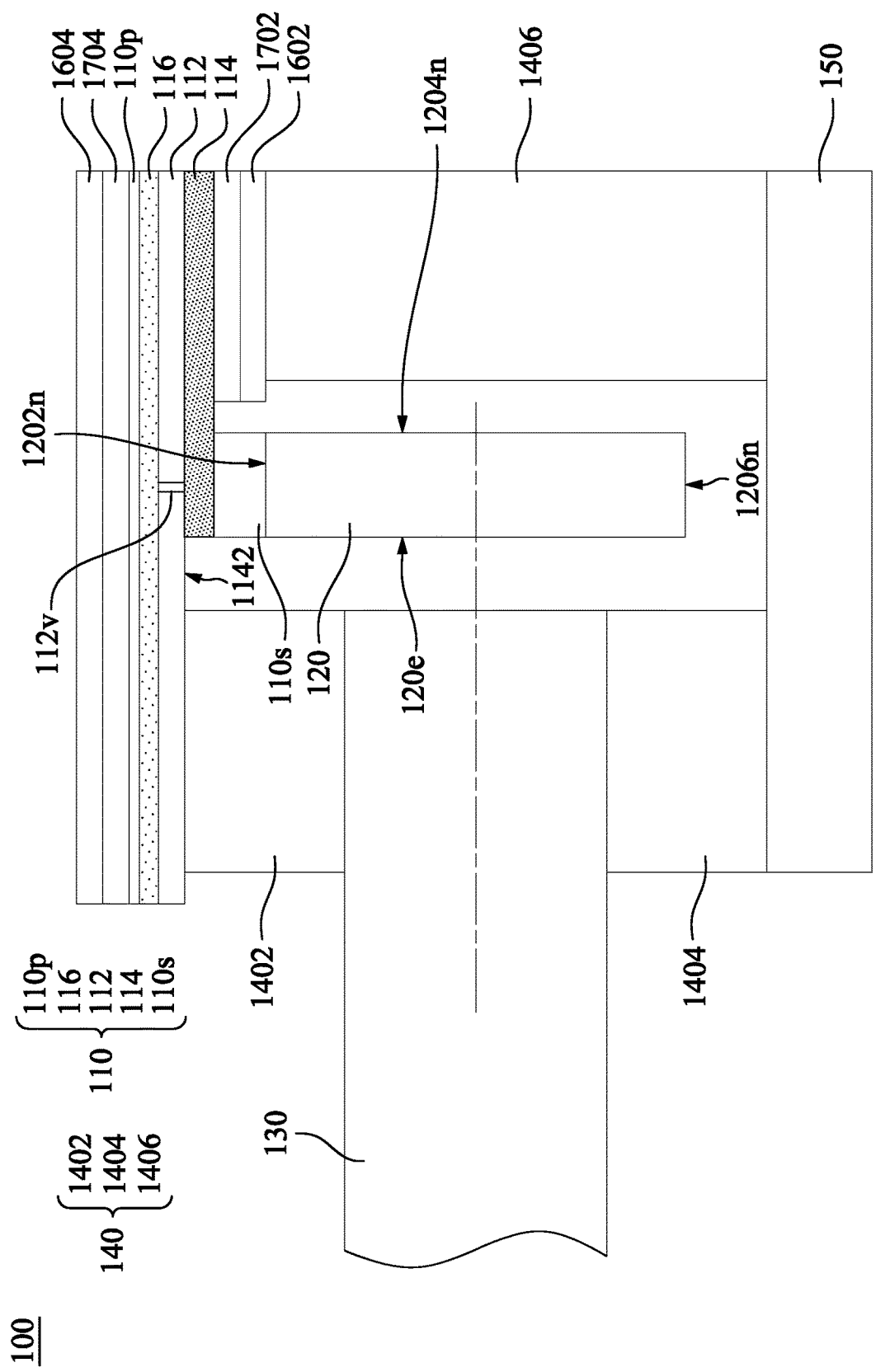
FIG. 3 is a schematic cross-sectional view of a lighting module according to another embodiment of the present invention.

FIG. 3 is a schematic cross-sectional view of a lighting module according to another embodiment of the present invention. The difference between FIG. 3 and FIG. 1 is that the plating layer 110p shown in FIG. 1 is not provided on the metal layer 114 of FIG. 3, so the solder paste 110s of FIG. 3 is directly formed on and in direct contact with the metal layer 114. The thickness of the solder paste 110s is adjusted according to the specific thickness of the light guide plate 130 and the thickness of the waterproof adhesive 1402 (e.g., waterproof double-sided tape) for achieving excellent waterproof performance to let the optical axis of the light emitting diode 120 coincide with or substantially coincide with the symmetry axis of the light guide plate 130.

In other embodiments (not shown), a sufficiently thick plating layer is provided on the metal layer, but no solder paste is provided thereon. The thickness of the plating layer is adjusted according to the specific thickness of the light guide plate and the thickness of the waterproof adhesive (e.g., waterproof double-sided tape) for achieving excellent waterproof performance to let the optical axis of the light emitting diode coincide with or substantially coincide with the symmetry axis of the light guide plate.

Figure 4:
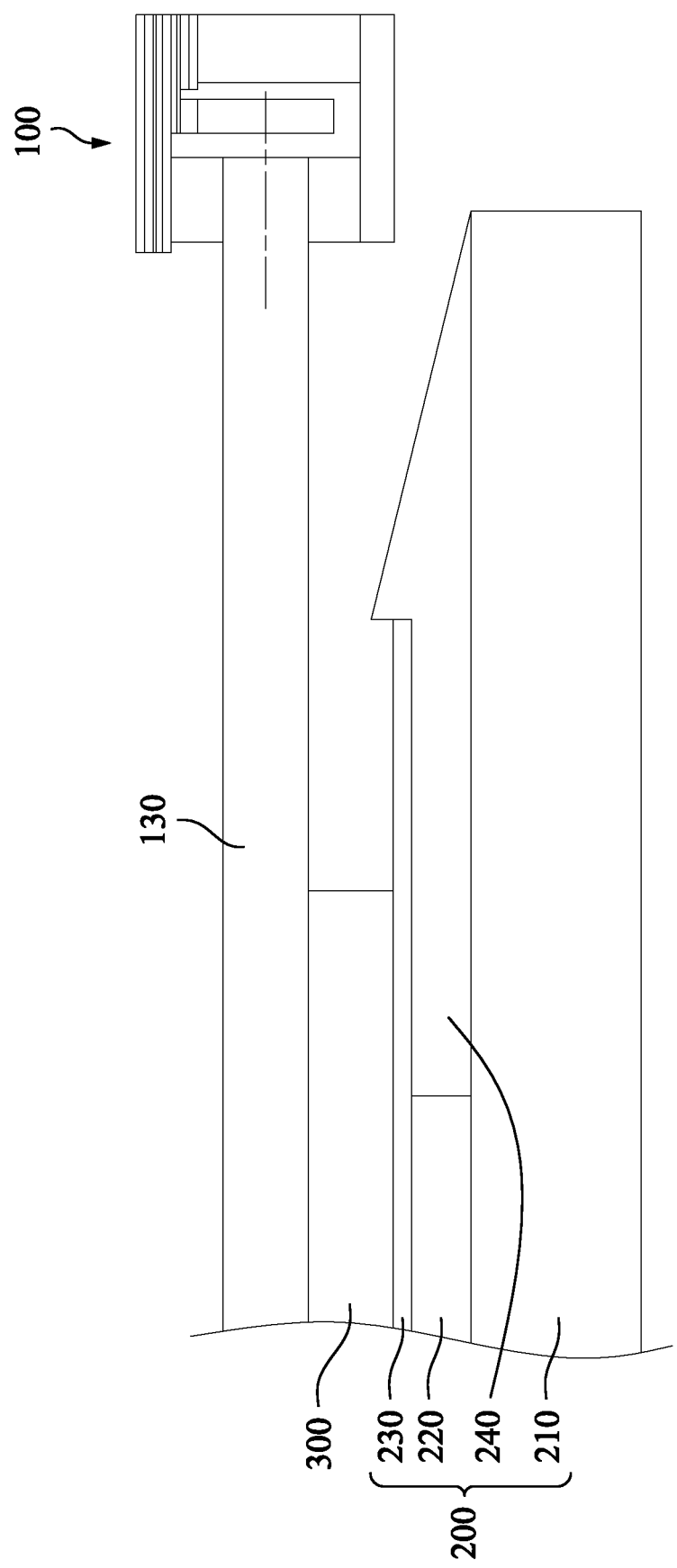
FIG. 4 is a schematic cross-sectional view of a display device according to an embodiment of the present invention.

The present invention also provides a display device. FIG. 4 is a schematic cross-sectional view of a display device according to an embodiment of the present invention. As shown in FIG. 4, the display device includes a lighting module 100 and a display panel 200.

The lighting module 100 may be, for example, the lighting module shown in FIGS. 1 to 3. The lighting module 100 of FIG. 4 takes the lighting module shown in FIG. 1 as an example.

The display panel 200 is fixed on a surface of the light guide plate 130 of the lighting module 100. In some embodiments, the display panel 200 is a liquid crystal display panel, an organic light emitting display panel or an electrophoretic display panel.

In some embodiments, the display panel 200 is fixed on the light guide plate 130 through an adhesive layer 300. In some embodiments, the adhesive layer 300 is optically clear adhesive (OCA).

In some embodiments, the display panel 200 includes a driving substrate 210, a front panel 220, a front protective layer 230, and a waterproof adhesive 240.

In some embodiments, the driving panel 210 is a thin film transistor array substrate. In some embodiments, the driving substrate 210 includes a flexible substrate (not shown) and a driving circuit (not shown) disposed thereon. In some embodiments, the flexible substrate includes polyimide, polyethylene terephthalate, polyethylene naphthalate or polymethyl methacrylate.

In some embodiments, the front panel 220 includes an electrophoretic display layer (not shown) and a driving electrode layer (not shown) disposed over the electrophoretic display layer. In another embodiment, the front panel 220 may include an organic electroluminescent display layer.

In some embodiments, the front protective layer 230 is made of polyethylene terephthalate or polyethylene naphthalate. In some embodiments, the front protective layer 230 is directly attached on the front panel 220. In some embodiments, the waterproof adhesive 240 is a silicon-based or epoxy-based adhesive.

The present invention further provides a lighting module. FIG. 1 is a schematic cross-sectional view of a lighting module according to an embodiment of the present invention. As shown in FIG. 1, the lighting module includes a circuit board 110, a light emitting diode 120, a light guide plate 130, and a waterproof adhesive 140.

The circuit board 110 has a thin portion 110t. In some embodiments, the circuit board is a double-layer board, which includes, for example, a circuit layer 116, an insulating layer 112, and a complete metal layer. After a portion of the complete metal layer is removed, a metal layer 114 having an opening 1142 is formed. A portion of the circuit board 110 beneath the opening 1142 is the thin portion 110t of the circuit board 110. There is a step difference (or thickness difference) between the thin portion 110t and another portion of the circuit board. In other embodiments, a depth of the opening can be adjusted arbitrarily, as long as the thickness of the circuit board beneath the opening (i.e., the thin portion) is less than the other portion of the circuit board.

In other embodiments, other processes may be used to form the thin portion of the circuit board, as long as the thickness of the thin portion is less than another portion of the circuit board. For example, a material layer may be formed on a portion of the circuit board, and another portion of the circuit board that is not covered by the material layer is the thin portion.

The light emitting diode 120 is adjacent to the thin portion 110t of the circuit board 110. The light emitting diode 120 has a light emitting surface 120e and a non-light emitting surface. In some embodiments, referring to FIG. 1, the light emitting diode 120 has the light emitting surface 120e and a plurality of non-light emitting surfaces 1202n, 1204n, and 1206n, and the non-light emitting surface 1202n faces the other portion (not the thin portion) of the circuit board 110. In addition, as shown in FIG. 1, the non-light emitting surface 1202n and the light emitting surface 120e of the light emitting diode 120 are adjacent to the thin portion 110t of the circuit board 110.

The light guide plate 130 is parallel or substantially parallel to the circuit board 110 and is adjacent to the light emitting surface 120e of the light emitting diode 120.

The thin portion 110t of the circuit board 110 is adhered to the light guide plate 130 through the waterproof adhesive 1402. Since the thickness of the thin portion 110t is less than the other portion of the circuit board, the thick waterproof adhesive 1402 can be provided between the thin portion 110t and the light guide plate 130, thereby effectively preventing the light emitting diode 120 from being damaged by moisture.

The features of various embodiments are briefly mentioned above, so those skilled in the art can better understand various aspects of the present invention. Those skilled in the art should realize that in order to implement the same purpose and/or achieve the same advantages of the embodiments presented herein, and they can easily use the present invention as a basis for designing or modifying other processes and structures. Those skilled in the art should also understand that these equal constructions do not depart from the spirit and scope of the present invention, and that they can make various changes and substitutions here without departing from the spirit and scope of the present invention.

What is claimed is:

1. A lighting module, comprising:
   a circuit board having an insulating layer, a metal layer and a circuit layer, the insulating layer being interposed between the metal layer and the circuit layer, the metal layer having an opening exposing a portion of the insulating layer;
   a light emitting diode having a light emitting surface and a non-light emitting surface, the non-light emitting surface facing the metal layer;
   a light guide plate parallel or substantially parallel to the circuit board and adjacent to the light emitting surface of the light emitting diode, an optical axis of the light emitting diode coinciding with or substantially coinciding with a symmetry axis of the light guide plate; and
   a waterproof adhesive, the portion of the insulating layer being adhered to the light guide plate through the waterproof adhesive.

2. The lighting module of claim 1, wherein the circuit board further comprises a solder paste disposed between the non-light emitting surface of the light emitting diode and the metal layer.

3. The lighting module of claim 2, wherein the circuit board further comprises a plating layer disposed between the solder paste and the metal layer.

4. The lighting module of claim 2, further comprising:
   a first cover layer covering the metal layer and laterally adjacent to the solder paste.

5. The lighting module of claim 1, further comprising:
   a second cover layer covering the circuit layer.

6. The lighting module of claim 1, further comprising:
   a substrate parallel or substantially parallel to the circuit board, the light guide plate being interposed between the circuit board and the substrate.

7. The lighting module of claim 6, wherein the waterproof adhesive is further disposed between the light guide plate and the substrate.

8. The lighting module of claim 6, wherein the waterproof adhesive is further disposed between the circuit board and the substrate.

9. The lighting module of claim 1, wherein the insulating layer has a via hole disposed in the insulating layer, and the light emitting diode is electrically connected to the circuit layer through the metal layer and the via hole.

10. A display device, comprising:
    the lighting module of claim 1; and
    a display panel fixed on a surface of the light guide plate.

11. A lighting module, comprising:
    a circuit board having a thin portion;
    a light emitting diode adjacent to the thin portion of the circuit board, the light emitting diode having a light emitting surface and a non-light emitting surface, the non-light emitting surface facing the circuit board;
    a light guide plate parallel or substantially parallel to the circuit board and adjacent to the light emitting surface of the light emitting diode; and
    a waterproof adhesive, the thin portion of the circuit board being adhered to the light guide plate through the waterproof adhesive;
    wherein the thin portion comprises an insulating layer directly disposed on the water proof layer, and a circuit layer disposed on the insulating layer.

* * * * *